March 3, 1959  P. E. BECHTOLD  2,875,710
WINDOW STRUCTURE
Filed Feb. 19, 1953  2 Sheets-Sheet 1
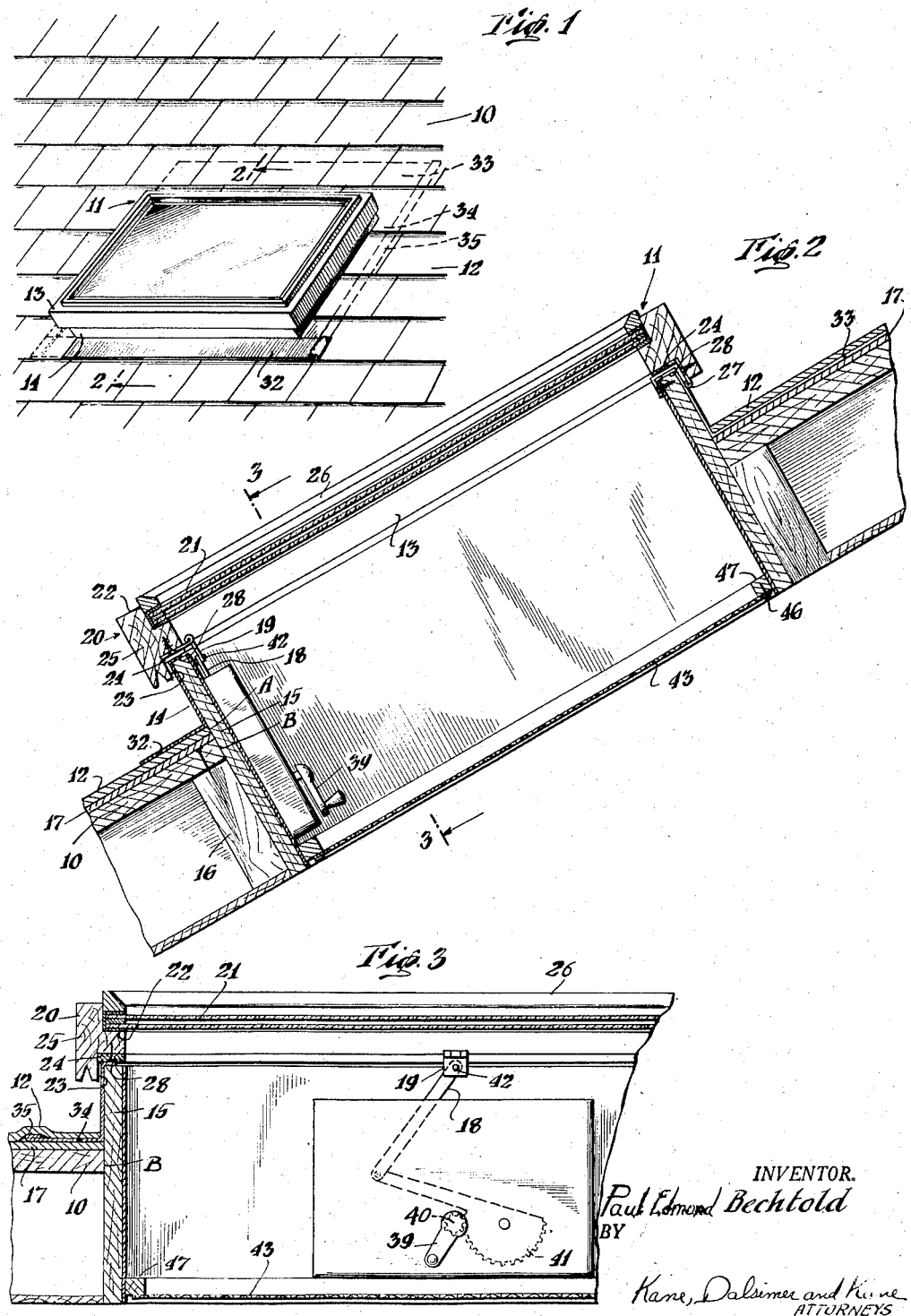
INVENTOR.
Paul Edmond Bechtold
BY
Kane, Dalsimer and Kane
ATTORNEYS March 3, 1959 P. E. BECHTOLD 2,875,710
WINDOW STRUCTURE
Filed Feb. 19, 1953 2 Sheets-Sheet 2
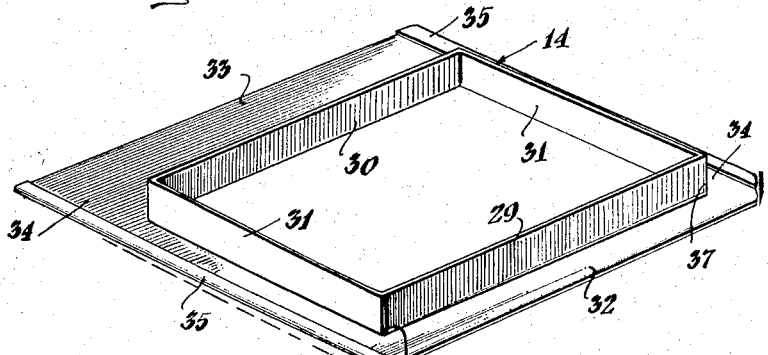
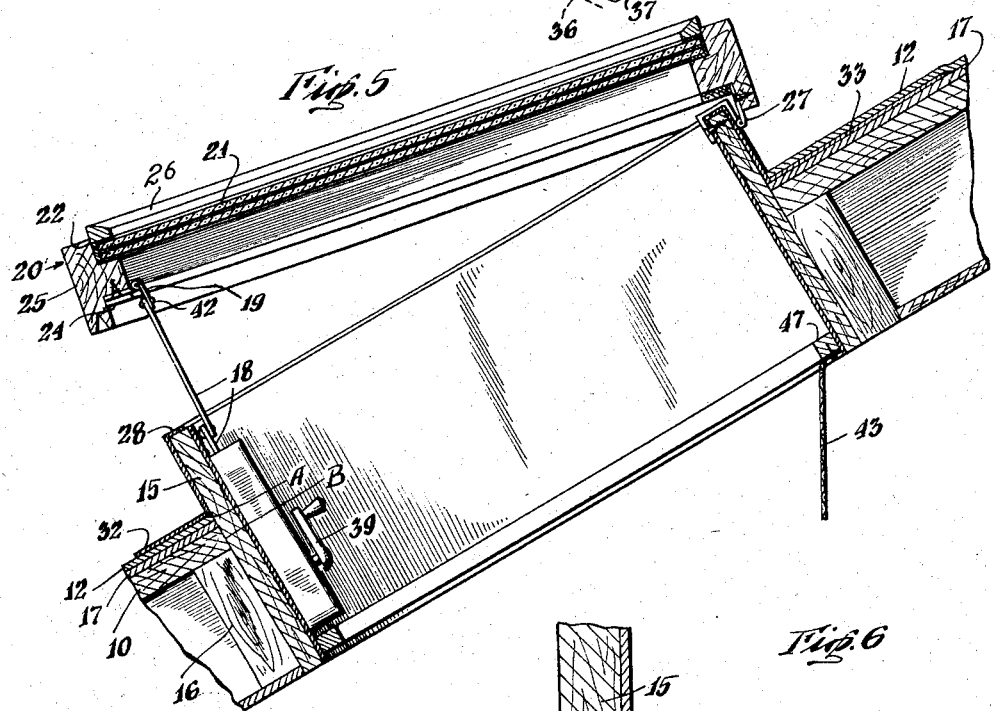
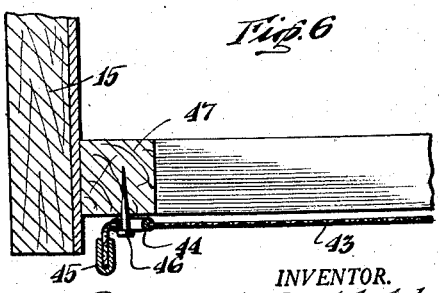
INVENTOR.
Paul Edmond Bechtold
BY
Kane, Dalsimer and Kane
ATTORNEYS

United States Patent Office 2,875,710
Patented Mar. 3, 1959

2,875,710

WINDOW STRUCTURE

Paul Edmond Bechtold, Port Washington, N. Y.

Application February 19, 1953, Serial No. 337,767

1 Claim. (Cl. 108—16)

This invention relates to a window structure and more particularly to a swinging light window in a roof. It is an object of this invention to provide a roof window which does not leak. It is a further object of this invention to provide a roof window which is insertable into a finished roof and which opens outwardly. Still another object of this invention is to provide a one piece flashing frame to a roof window which is insertable in a finished roof.

It is still another object of this invention to provide a roof window for insertion in a finished roof, the mechanical components of this window being pre-fabricated. These and other objects of this invention will become more apparent upon consideration of the following description taken together with the accompanying drawings in which:

Fig. 1 is a perspective view of a roof section incorporating a roof window structure according to this invention;

Fig. 2 is a vertical sectional view of the roof and roof window structure of Fig. 1 taken on line 2—2 of Fig. 1 in the direction of the arrows;

Fig. 3 is a transverse vertical section of a portion of the roof window construction of Figs. 1 and 2 taken on line 3—3 of Fig. 2 in the direction of the arrows;

Fig. 4 is a perspective view of the one piece flashing frame of the roof window structure of this invention;

Fig. 5 is a transverse section similar to Fig. 3 with the swinging light of the window in partially opened position; and, Fig. 6 is an enlarged view of a section of a portion of the window structure of this invention showing the part of a screen and a fastening means therefor.

A roof 10 is shown in Fig. 1 having thereon a roof window structure 11. The roof 10 is overlaid with conventional shingles 12; the window structure 11 has outside swinging light 13 which rests over a flashing frame 14.

In Fig. 2 the window structure 11 is shown in section to illustrate the relationship between the swinging light 13, the flashing frame 14 and a box frame 15 on which the flashing frame 14 and the swinging light 13 are mounted. The box frame 15 is supported in the roof 10 on headers 16. The box frame extends exteriorly of the roof 10 and over the exterior portion of the box frame 15 is mounted the flashing frame 14. The swinging light 13 is hinged at one side of the exterior portion of the box frame 15. The roof 10 is covered with a roof sheathing 17 and the shingles 12 are laid over the sheathing 17.

In Fig. 3 lever arms 18 are shown in the window raising mechanism. One of the lever arms is pivotably attached to a hinge 19. A window frame 20 of the swinging light 13 carries a suitable pane of glass 21. The pane of glass 21 is mounted in a rabbet 22 of the window frame 20. One plate of the hinge 19 is fastened to the inner face of the body of the frame 20 adjacent the rabbet 22.

The window frame 20 is also provided with an inner rabbet 23 which carries a felt strip 24. The felt strip 24 abuts against the outer edge of the box frame 15. When the swinging light 13 is in closed position as shown in Figs. 2 and 3 an overhang 25 of the window frame 20 is also provided by the rabbet 23. The overhang 25 overlaps and encompasses the upper edge of the frame 15. A molding 26 is provided over the pane 21 to hold the pane 21 in the rabbet 22. The window frame 20 is hinged on the box frame 15 by a hinge 27 at the rear side of the window structure 11. In position the swinging light 13 with the overhang 25 is superimposed over and around the upper portion of the flashing frame 14.

The flashing frame 14 is shown in Fig. 4 separate from the window structure 11. The flashing frame 14 is four-sided, having an upright front wall 29, an upright rear wall 30, and two identical upright side walls 31. Extending from each of the walls 29, 30 and 31 are lateral flanges in the form of aprons which are integral with and continuous from their respective walls. The apron 32 is associated with and extends from the front wall 29. The apron 33 is associated with and extends from the rear wall 30. Identical aprons 34 each extend from each of the side walls 31. Each apron 34 has its outer edge folded back on itself to form a lip 35. The wall 29 is of shorter height than the other three walls. The shorter height of the wall 29 is accommodated in the flashing frame 14 by the aprons 32, 33, 34 and 35. The plane of the aprons may be non-perpendicular to the vertical dimension of the side walls 31, the front 29 and the rear wall 30 so that the plane of the aprons 32, 33, 34 and 35 is slightly upward towards the front wall. Also, an offset 36 may be provided at the two corners 37 where the front wall 29 joins the side walls 31 at its respective ends. This offset 36 is located on the lower edge of the flashing frame 14 so that a continuous and even upper edge runs around the top of the flashing frame 14.

The flashing frame 14 is constructed to fit snugly around the outer and protruding portion of the box frame 15. The flashing frame is on the outer surfaces of this protruding portion of the box frame 15. The flashing frame 14 is provided at the upper edge of the walls 29, 30 and 31 with a short in-turn flange 28. This flange 28 overlies the upper surface of the frame 15. As shown in Figs. 2 and 5, the rear apron 33 is covered by shingles 12 of the roof 10. The apron 33 similarly overlies the roof sheathing 17. Thus, the apron 33 is sandwiched between the shingles 12 and the sheathing 17. The side aprons 34 are similarly in a position between the shingles 12 and the sheathing 17, as shown in Fig. 3. In Fig. 1 the aprons 33 and 34 are shown in dotted outline to indicate their position and the fact that they are overlain by the shingles 12.

On the other hand, the front apron 32 which is integral with and continuous from the wall 29 seats against the upper surface of the shingles 12 which lie directly adjacent to the front side of the window structure. The flange 28 also integral with and continuous from the wall 29 extends over the top of the frame 15. There is thus provided a continuous sheet of metal extending from over the top surface of the box frame over the side of the exterior exposed outer surface of the box frame and over the adjacent portion of the roof 10 on the front of the roof.

As shown in Figs. 1 and 3 the side aprons 34 underlie the adjacent shingles 12 so that the continuous sheet of metal of the flashing frame 14 at the sides of the box frame 15 extends from the flange 28 over the outer surface of the exteriorly exposed portion of the box frame and over the adjacent surface of the roof sheathing 17 but under the adjacent shingles 12.

In Figs. 1, 2 and 5 it is similarly shown that the rear apron 33 extends beneath the rear shingles so that the portion of the flashing frame at the rear of the window structure 11 extends from the flange 28 over the outer surface of the exteriorly exposed portion of the box frame 15 and over the adjoining surface of the roof sheathing 17 but beneath the adjacent shingles 12.

The offset 36 between the plane of the apron 32 and the plane of the aprons 33 and 34 is slightly greater than the width of the shingles 12. The aprons 33 and 34 when brought into abutment with the roof sheathing 17 will fit the flange 28 snugly against the top surface of the box frame 15. With the flashing frame 14 thus fitted on the box frame 15, the apron 32 will be held slightly away from the upper surface of the adjoining shingles 12 at point "A" close to the box frame 15. According to this invention, the flashing frame 14 is constructed with the apron 32 having a slight downward and outward inclination. The apron 32 in its final position extends downwardly with relation to the frame 15 so that its outer edge is held in close engagement against the upper surface of the adjacent shingles. This serves to provide a seal between the outer edge of the apron 32 and the shingles.

With the window frame 20 in a closed position as shown in Fig. 2, the felt strip 24 is brought into abutment with the flange 28 and the overhang 25 overlaps the upper portion of the walls 29, 30 and 31. The walls 29, 30 and 31 cover the outer and exposed surfaces of the box frame 15. The aprons 33 and 34 extend laterally from the frame 15 over the roof sheathing 17 and the apron 32 extends laterally from the frame 15 over the shingles 12. The rear apron 33 extends beneath the adjacent shingles 12 to a greater distance than the side aprons 34. This is to prevent water from backing up against the rear of the window structure 11 and under the overlapping shingles 12 beyond the point where the rear apron 33 seals off the joint between the frame 15 and the roof 10. Similarly, the turned-over lips 35 of each of the side aprons 34 tend to contain any seeping water and prevent it from running under the aprons 34 to the joint between the frame 15 and the roof 10.

In operation the closed window frame 20 in cooperation with the flashing frame 14 seal moisture away from the joint "B" between the box frame 15 and the roof 10. This continuous seal is provided by the window frame 20 with its pane of glass 21, the felt strip 24, the flange 28, the walls 29, 30, 31 and the aprons 32, 33, 34. Also cooperated in this seal is the overhang 25 which helps prevent wind-blown water from penetrating the butt-seal between the felt strip 24 and the flange 28. The opening and closing of the window frame 20 is accomplished by means of a crank and quadrant arrangement which operates the lever arms 18. As shown in Fig. 3, a crank 39 turns a gear 40 which engaging a toothed portion of a quadrant 41 rocks the quadrant to move the attached lever arms 18 up or down. The upper lever arm 18 is attached to the lower lever arm 18 by a pivot pin. The upper lever arm 18 is similarly attached to the free plate of the hinge 19 by a pin. The axis of rotation around pin 42 is at right angles to the axis of flexure of the hinge 19, as shown in Figs. 2, 3 and 5.

In Fig. 2, the window frame 20 is shown in closed position with the lever arms 18 retracted. In Fig. 5, the window frame 20 is shown in open position with the lever arms 18 in extended position. In moving from the closed position of Fig. 2 to the open position of Fig. 5, the hinge 19 is flexed so that the angle between the two plates of the hinge is changed in accordance with the arc of travel of the window frame 20 as it pivots on the window frame hinges.

A window screen may be provided the window structure 11. A window screen is illustrated in Fig. 6 by an extensible screen 43 which is made up of a screening material which is slightly resilient and a grommet 44 to which is attached a suitable pull-tab 45. A post 46 is provided on a strip 47 positioned adjacent the inner or bottom edge of the frame 15, as shown in Figs. 2, 3 and 5. The screen 43 is attached to the strip 47 at one side of the window structure 11 and is stretched across the window opening. The grommet 44 may be hooked over the post 46 to hold the screening closed across the window opening under the elastic pull of the screening. The screen 43 may be opened by pulling the pull-tab 45 to disengage the grommet 44 from the post 46 and thus unhook the screen 43.

Among the advantages of this invention is the provision of an exterior seal around the window structure which excludes moisture and cold air from entering through the window opening. The flashing frame of this invention is an integral piece which is prefabricated. As a result of the prefabrication possibilities of the flashing frame, the most difficult part of the assembling of a window structure is completely removed by this invention and reduced to an operation in which there is no difficulty whatsoever. In the first place, the integral flashing frame eliminates any necessity for assembling flashing pieces and putting them into place on the roof. In the second place, the standardization which is permitted by the prefabricated integral flashing frame provides a certainty of satisfactory operation of the completed window structure. It will be readily understood that the householder employing a window structure of this invention will derive benefit from the complete absence of leakage around the window structure.

The window raising mechanism described is advantageous in its simplicity. The window raising mechanism is also advantageous in providing a gradual opening and closing of the window with a resultant easy adjustment of the angle of the window frame and the amount of opening. Of particular advantage in this invention is the seal obtained between the front apron of the flashing frame and the upper surface of the shingles. The integral flashing frame provides a rigidity of structure which is a basis for the downwardly biased front apron. The front apron thus anchored on the frame can be tightly sprung against the shingled surface and prevent leakage of the water backup under the front apron. At the same time, positioning of the front apron on top of the shingles prevents the water from running underneath the shingles at the point of abutment of the shingles with the front of the window frame. This point is indicated as "A" in the accompanying description.

As shown in Figures 2 and 3 the hinge 27 has one plate fastened to the overhang 25 of the window frame 20 on its innerside. The other plate of the hinge 27 is U shaped and is cupped over the upper edge of the box frame 15. This hinge plate is screwed to the inside surface of the box frame 15. In this way the flashing frame 14 is not pierced by the screws which fasten the hinge 27.

It will be understood that the description of this invention in the embodiments illustrated in the figures as described above is for the purpose of illustration. Various modifications of these embodiments may be made without departing from the spirit of this invention. For example the hinge 27 may be modified by the substitution of a conventional hinge without detracting from the other features of this invention. Accordingly, it is intended that the scope of this invention be limited only by the appended claim.

I claim:

In a window device for a roof opening in a building structure, the combination of a box-like frame extending transversely through said building structure opening, a joint formed between said building structure and said frame; a continuous unperforated weather proof flashing on and over the outer and upper surfaces of said frame and adjacent surfaces of said building structure and covering said joint, a plurality of portions making up said flashing, each of said portions overlying an exteriorly exposed part of said frame, each flashing portion composed of a wall, a flange extending laterally from said wall at one edge thereof and an apron extending laterally from said wall at the opposite edge thereof so as to cover said joint from the exterior of said building, one apron of one portion of said flashing wall being vertically more removed from the surface of said building structure than the remainder of the flashing aprons and being superimposed over the surface material of said building structure, said apron of said first flashing wall being spring-biased to extend from said latter flashing wall into close contact with the outer surface of said surfacing material, and the remainder of the aprons of said flashing portions underlying surfacing material on said building structure, the aprons of the two flashing walls immediately adjacent said first flashing wall having turned over lips along their peripheral edge portions for receiving seepage water and channeling same to outer surfaces of said surfacing material, a window frame including a forward frame member and a rearward frame member, a first hinge means pivotally securing said rearward frame member to the rear of said box-like frame, a second hinge means secured to the interior of said forward frame member and provided with a depending plate for pivotal movement in a direction at right angles to the plane of said forward frame member, said second hinge plate being provided with a pin projecting in a direction at right angles to the plane of said plate, lever means for swinging said window frame about said first hinge means to open and close said window frame and to position said window frame in any desired intermediate position, said lever means including an upper lever arm and a lower lever arm pivotally secured thereto, the upper end of said upper lever arm being pivotally mounted on said pin for swinging movement in the plane of said forward frame member, said lower lever arm being pivotally mounted upon the interior of the forward portion of said frame for swinging movement in the plane of said forward frame member, a tooth portion being provided on said lower lever arm and means coupled with said forward frame member including a crank and a gear meshing with said tooth portion for pivoting said lower lever arm.

References Cited in the file of this patent

UNITED STATES PATENTS

| | | |
|---|---|---|
| 181,547 | Wehrle | Aug. 29, 1876 |
| 470,896 | Parrott | Mar. 15, 1892 |
| 507,993 | Burnham | Nov. 7, 1893 |
| 508,390 | Linkletter | Nov. 7, 1893 |
| 929,615 | Madden | July 27, 1909 |
| 968,480 | Just et al. | Aug. 23, 1910 |
| 2,300,842 | Leslie | Nov. 3, 1942 |
| 2,609,069 | McLaughlin | Sept. 2, 1952 |

FOREIGN PATENTS

| | | |
|---|---|---|
| 40,607 | Austria | of 1910 |
| 486,454 | France | Apr. 9, 1918 |
| 441,093 | Great Britain | of 1936 |
| 239,319 | Switzerland | of 1946 |
| 247,943 | Switzerland | of 1948 |